Dec. 2, 1958          I. B. RACHMAN ET AL          2,862,778
BRACED LEG CONSTRUCTION AND METHOD OF FORMING SAME
Filed Oct. 4, 1957
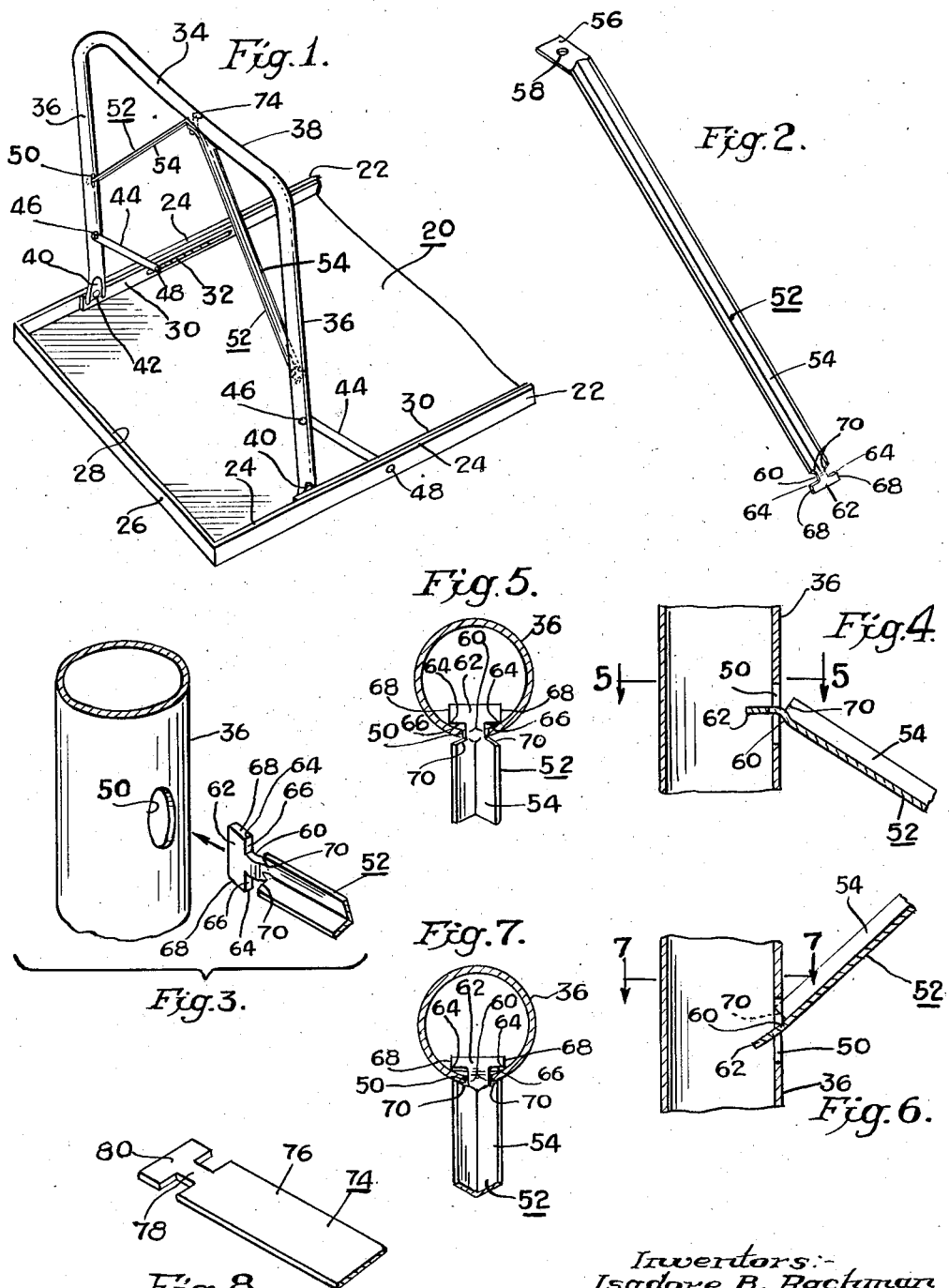
Inventors:-
Isadore B. Rachman
Sidney Bobb
by Arthur N. Klein
Attorney //patents.google.com for the full text

United States Patent Office 2,862,778
Patented Dec. 2, 1958

2,862,778

BRACED LEG CONSTRUCTION AND METHOD OF FORMING SAME

Isadore B. Rachman and Sidney Bobb, Philadelphia, Pa., assignors to H & L Realty Corporation, Philadelphia, Pa., a corporation of Pennsylvania Application October 4, 1957, Serial No. 688,279

4 Claims. (Cl. 311—98)

The present invention relates generally to the art of making an angular connection between a tubular member and a non-tubular member and it relates more particularly to the bracing of tubular members, for example tubular leg members for tables or the like.

An object of the present invention is to provide a novel construction for an angular connection between a tubular member and a non-tubular member, as well as a method of forming the same. Another object of this invention is to provide a new and improved bracing structure for a tubular member, such as a tubular leg member for a table or the like, and a novel method of forming the same. A further object of this invention is to provide a novel structure, as well as a method of forming the same, whereby it is possible quickly and easily to attach one end of a bracing member to a tubular leg member or the like, so that the two are securely and rigidly interconnected in angular relationship without the need for separate screws or other connecting elements or for welding or brazing or other like fastening means. Other objects and advantages of the present invention are apparent in the following detailed description, appended claims and accompanying drawings.

For the purpose of illustrating the invention, there are shown in the accompanying drawings, forming part hereof, certain forms which are presently preferred, it being understood however that the invention is not limited to the precise arrangements or instrumentalities illustrated.

Referring to the drawings, in which like reference numerals indicate like parts throughout:

Figure 1 is a perspective view of a braced tubular generally U-shaped leg member forming one embodiment of the present invention as used on a table; the table being shown fragmentarily in upside down position.

Figure 2 is an enlarged perspective view of one of the brace members as it appears before connection with the leg member.

Figure 3 is a further enlarged fragmentary perspective view illustrating a preliminary stage in the assembly of the brace member with the leg member, namely the lining up of the brace head portion so that its width or transverse dimension is in alignment with the major axis of the elongated opening in the leg member.

Figure 4 is a longitudinal sectional view through the leg member showing a subsequent stage in the assembly, namely after the brace head portion has been inserted through the leg member opening and then turned approximately 90 degrees (clockwise from the position of Fig. 3).

Figure 5 is a cross-sectional view taken generally along the line 5—5 of Fig. 4.

Figure 6 is a view like that of Fig. 4 but showing the final stage in the assembly of the brace member with the leg side portion, namely after the brace member has been swung (with corresponding bending of the narrow neck portion) to about a 45 degree angle with the leg side portion and with the concave or trough-like face of the V-section body portion directed toward the leg side portion.

Figure 7 is a cross-sectional view taken generally along the line 7—7 of Fig. 6.

Figure 8 is a fragmentary perspective view of another form of brace member.

In Fig. 1, there is shown a braced leg member forming one embodiment of this invention mounted on a table which may, for example, be a foldable metal table of the type more fully disclosed in Pucci Patent 2,643,926, granted June 30, 1953.

The table, which is fragmentarily shown in Fig. 1, includes a top section 20 having side flanges 22 with inturned free edges 24, and an end flange 26 with an inturned free edge 28. For greater clarity of illustration, the table top section 20 is shown, in Fig. 1, in inverted or upside-down position as it would be positioned when the leg member is being opened or closed. It is to be understood however that, in use, the table is turned over so that the flanges 22 and 26 depend from the main horizontal portion of the top section 20 and that the inturned free edges 24 and 28 are lowermost, as illustrated in Patent 2,643,926. The other end (not shown) of the top section 20 may be hingedly connected to a similar top section which can be positioned either in end-to-end coplanar open position or in side-by-side parallel closed position as disclosed in Patent 2,643,926; this construction not being essential to an understanding of the present invention. Of course, the novel braced tubular leg construction of the present invention can be used equally well on one-piece table tops, as well as on chairs and many other conventional articles of manufacture.

Slidably mounted against the inner face of the side flange 22 is an elongated mounting member 30 provided with a longitudinal slot 32; the construction and operation of said mounting member 30 being more fully shown and described in Patent 2,643,926.

The leg member 34 of this invention is preferably formed integrally from a length of tubing (which may be of steel or aluminum or any other suitable material) which is bent into more or less a U-shape with generally parallel side portions 35 and a lowermost base portion 38 which extends generally transversely of the top section 20 and may be slightly upwardly bowed to provide laterally or transversely spaced ground-contacting ends and a slightly elevated center.

The free end 40 of each side portion 36 is flattened and is pivotally connected by a pin 42 to the outermost end of the slidable mounting member 30. While only one mounting member 30 is shown in Fig. 1, it is to be understood that a similar mounting member (not shown) is provided at the opposite side flange of the top section 20 and that the connection of the opposite side portion thereto is the same as that shown and described herein.

Each side portion 36 is provided with a link 44, one end of which is pivotally connected, by a pin 46, to the side portion at a point spaced somewhat away from the pin 42. The other end of the link 44 is provided with a pivot pin 48 which passes through the slot 32 in the slidable mounting member 30 and is fastened to the side flange 22; said other end being bent somewhat to bring it closer to the member 30 after passing the inturned edge 24, as more fully described in Patent 2,643,926.

This construction enables the U-shaped leg member to be positioned either in the open or operative position shown in Fig. 1, or in a clockwise-rotated position (not shown) wherein it lies parallel to and generally adjacent the underside of the top section for compactness in storing. When the leg member is swung from the open position of Fig. 1 to the closed storage position, the pins 42 cause the slidable mounting members 30 to shift longitudinally (toward the left in Fig. 1) to bring the ends 40 relatively closer to the end flange 26. During opposite opening swinging of the leg member, the opposite ends (not shown) of the slidable mounting members may protrude into the adjoining coplanar top section (not shown) to lock them in coplanar open position and suitable means (not shown) may be provided releasably to maintain the slidable mounting members in top-aligning position, as described in Patent 2,643,926 but not being necessary to an understanding of the present invention.

As best shown in Figs. 1 and 3, each leg side portion 36 is provided with an elongated opening 50 spaced somewhat away from, but on the same side as, the point at which the link pivot pin 48 enters the side portion 36. As illustrated, the opening 50 is generally oval shaped with its major axis extending generally parallel to the axis of the tube and with a transverse or minor axis appreciably smaller than the major axis. For purposes of illustration, if the tube forming the leg member has a diameter of one inch, the major axis of the opening may be about 9/16" while the minor axis may be about 3/16". The opening 50 need not necessarily be oval shaped and could, for example, be rectangular with a comparatively narrow or small width; or it have other suitable non-circular configuration so long as the transverse dimension is appreciably smaller than the longitudinal dimension.

The opening 50 is constructed and arranged lockingly to receive one end of an elongated brace member 52 integrally formed from a length of relatively rigid and form-retaining metal strip; the construction of the brace member being best shown in Fig. 2.

Thus, the brace member 52 has an elongated body portion 54 which is transversely bent into a shallow V-shaped cross-sectional configuration. A flat end portion 56 having a hole 58 is bent at generally a 45 degree angle to the longitudinal axis of the body portion 54 and, as will be described, serves to fasten one end of the brace member to the center of the leg base portion 38. The end portion 56 is bent in the direction of the convex side of the V-shaped body portion 54; i. e., so that it forms an angle of less than 180 degrees with the convex side, while forming an angle of more than 180 degrees with the opposite or trough-shaped side of the body portion 54.

At the other end of its body portion 54, the brace member 52 is provided with an integrally formed relatively narrow neck portion 60 which extends in continuation of the center of the body portion and preferably is also curved toward the convex side of the body portion.

At the other end of the curved neck portion, there is provided an integrally formed relatively flat and plane head portion 62 which has a substantially greater transverse dimension or width than the neck portion 60. The inner end of the head portion (namely the end adjacent the neck portion 60) has sharp corner edges 64 formed by the juncture of transversely extending walls 66 and side walls 68, as best shown in Figs. 2, 3 and 5. In the drawings, the walls 66 and 68 are shown as forming a rectangular corner. However, the present invention also contemplates the formation of corners of less than 90 degrees by simply undercutting the walls 66 (instead of making them parallel as illustrated). In the drawings, the head portion 60 is shown as generally rectangular throughout, that is with square corners also formed at its outer end; although this rectangular configuration at the outer end is not essential.

Because of the bend or curve in the neck portion 60, the plane of the flat head portion 62 is at an angle to the longitudinal axis of the body portion 54 and is nearer the convex side of V-section body portion.

In order better to explain the relative proportions of the several parts and elements, the following dimensions are given as illustrative. The brace member 52 may be integrally formed from a flat strip of steel or the like having a width of 1/2" and a thickness of 1/16". The two arms of the V-shaped body portion 54 may include an angle of about 90 degrees. The neck portion 60 may be 1/8" wide and 3/16" long. The head portion 62 is the original 1/2" in width and may be 1/4" in length.

The leg member 34 may be of 3/4" steel tubing or 1" aluminum tubing. The major axis of the leg opening 50 may be 9/16" (i. e., slightly greater than the width of the brace head portion 62) while its minor axis may be 3/16" (i. e., slightly greater than the width of the brace neck portion 60).

In assembling the brace member 52 with the leg member 34, the two are first placed in the relative positions shown in Fig. 3, that is, with the brace head portion 62 having its transverse dimension or width in alignment with the major axis of the oval opening 50. The brace member is then moved forward, in the direction of the arrow in Fig. 3; the head portion 62 passing through the opening. This forward movement is continued until the forward edges 70 of the V-shaped body portion 54 halt the movement by contacting the outer cylindrical surface of the leg portion 36. At this point, the narrow neck portion 60 extends through the opening 50.

The brace member 52 is then turned so that its flat head portion 62 is rotated approximately 90 degrees from the inserting position of Fig. 3. In other words, the head portion 62 is now at right angles to the major axis of the opening 50, as shown in Figs. 4 and 5. During this rotation of the head portion 62, its sharp corner edges 64 contact and bite into the cylindrical inner wall of the tubing at points beyond the minor axis of the opening 50, thereby jamming and locking the brace member securely against return rotational movement. This jamming action also causes the forward edges 70 of the V-shaped body portion to lock against the outer wall of the tubing as indicated in Figs. 4 and 5.

This rotational movement of the brace member 52 should be in a direction such that, at the end of the 90 degree rotation, the concave or trough-like face of the V-shaped body portion 54 faces the base portion 38 of the U-shaped leg member 34.

In Figs. 3 and 4, it is assumed that the U-shaped leg member 34 is in the upside-down position of Fig. 1 (i. e. with the base portion 38 uppermost) and, therefore, after the brace head portion 62 is inserted through the opening 50, it is rotated 90 degrees clockwise from the inserting position of Fig. 3 to the position of Fig. 4. Of course, if the leg member 34 were in rightside-up position (that is, with the base portion 38 lowermost), the brace head portion 62 would be rotated oppositely (i. e., counterclockwise from the inserting position of Fig. 3) so that the concave face of the body portion 54 would face downward toward the base portion 38.

The brace member 52 can be inserted equally well from a position rotated 180 degrees from that shown in Fig. 3 (i. e., with the concave face of the body portion 54 facing toward the right instead of toward the left). In such case, the locking rotation of the inserted head portion 62 would simply be in the opposite direction (i. e. 90 degrees counterclockwise if the leg member is upside down and 90 degrees clockwise if the leg member is right-side-up), so as to bring the concave face of the body portion to face the base portion 38.

After the locking rotation of the brace head portion 62 has been completed, pressure (either manual or mechanical) is exerted against the convex face of the brace member 52 at a point spaced appreciably away from the engaged head portion so as to generate leverage tilting the brace member so that its unattached end swings toward the base portion 38 of the leg member 34. In the illustrated embodiment, this swing is upward from the position of Fig. 4 to the position of Fig. 6.

During the initial part of this swinging movement, the inserted head portion 62 tilts oppositely (i. e. downward from the horizontal position of Fig. 4 to the inclined position of Fig. 6) until the edges of the walls 66 wedge against the inner surface of the tube and halt further tilting of the head portion.

After this initial tilting of the head portion has been stopped, the leverage generated on the brace member causes the narrow neck portion 60 to bend in a direction opposite to its original direction of curvature so that, as indicated in Figs. 6 and 7, the plane of the head portion 62 ultimately is nearer the concave rather than the convex side of the body portion 54. As the bending continues, the converging forward edges of the body portion are brought into more or less tangential contact with the cylindrical outer surface of the leg side portion 36 at opposite sides of the opening 50, thereby providing a more rigid and secure bracing connection with the leg portion 36 and also further eliminating any possibility of inadvertent unlocking rotation of the brace member relative to the leg opening.

Swinging of the free end of the brace member 52 is continued until its flat end portion 56 contacts the slightly bowed center of the base portion 38. As shown in Fig. 1, a separate brace member 52 is connected to each of the two parallel side portions 36 of the leg member 34, and the two end portions 56 are secured to the center of the base portion 38 in overlapped relationship, by means of a screw 72 which passes through the aligned holes 58 and also through aligned holes formed in the center of the base portion.

The oval openings 50 in the side portions 36 and the center holes in the base portion 38 are preferably equidistant from the corner bends of the U-shaped leg member 34 so that, when the assembly is completed, the body portion of the brace member is generally at a 45 degree angle to the leg side portion 36 on each side for most efficient bracing action. However, a single length brace member can be used with leg members of different transverse dimensions by simply placing the oval openings 50 nearer to, or further from, the base portion 38. The resultant change in the angle between the leg portion 36 and the brace member does not significantly detract from the effectiveness of the bracing action.

The use of a V-shaped section for the brace body portion 54 not only locks the brace against twisting (by reason of the tangential contact of the converging forward edges 70 with the cylindrical outer surface of the tubular leg portion 36 as described above) but also greatly increases the structural strength and rigidity of the brace (over and above what could be gotten from a flat plane brace) since it serves as a reinforcing rib.

In Fig. 8, there is shown a simplified and less expensive brace member 74 which generally resembles the brace member 52 described above except as pointed out below. In this embodiment, the body portion 76 is flat and plane (instead of being V-shaped in cross-section), and the narrow neck portion 78 is straight and uncurved so that the rectangular head portion 80 lies in the same plane as the body portion 76.

The manner of attaching the brace member 74 is generally the same as that described above except that care must be taken to make sure that the neck portion 78 is properly lined up with the leg opening before the brace is turned 90 degrees into locking position. The subsequent swinging of the other end of the brace member and its attachment to the leg base portion 38 are carried on as previously described, although, since the brace body portion is plane there is no tangential contact of great consequence between its forward end and the outside of the tubular leg. Also, as mentioned previously, the flat brace body portion is not as strong as the V-shaped configuration. However, the embodiment of Fig. 8 may have advantages where cost (i. e. less expensive forming and cutting dies) and speed of production are important.

The present invention may be embodied in other forms and therefore the description and drawings are to be considered in all respects merely as illustrative and not restrictive; reference being made to the appended claims, rather than to the foregoing specification as indicating the scope of this invention.

Having thus described our invention, we claim as new and desire to protect by Letters Patent the following:

1. A braced leg construction comprising a generally tubular leg member having an elongated hole formed therein, the major dimenison of the hole being disposed generally axially of the tubular leg member; and a brace member rigidly connected at one end to said tubular leg member in angular relationship thereto, said brace member having an elongaetd body portion, a relatively narrow neck portion formed at one end of the body portion, and a relatively wider head portion formed at the other end of the neck portion, said head portion being relatively thin and having a transverse dimension or width slightly less than the major dimension of the leg member hole while the neck portion has a transverse dimension or width slightly less than the minor dimension of the hole, said head portion having a pair of generally plane walls extending transversely outward from opposite sides of the neck portion juncture and terminating in relatively sharp corner edges, said head portion being insertable through the elongated hole with its transverse dimension generally along the major axis of the hole and being thereafter rotatable within the tubular leg member through generally 90 degrees into locking position wherein the corner edges of the head portion grippingly engage the concave inner surface of the tubular leg member at points oppositely circumferentially spaced from the hole and wherein the transverse dimension of the neck portion is disposed generally along the minor dimension of the hole, the brace body portion having a pair of walls extending generally transversely outward from opposite sides of the neck portion juncture, said body portion transverse walls being jammed against the convex outer surface of the tubular leg member in locking position so as to maintain gripping pressure upon the corner edges of the inserted head portion and thereby to resist inadvertent unlocking rotation of the brace member relative to the tubular leg member.

2. A construction according to claim 1 wherein the brace body portion is generally V-shaped in cross-sectional configuration and is disposed at an acute angle to the leg member.

3. A construction according to claim 1 wherein the brace body portion is disposed at an acute angle to the leg member and is generally V-shaped in cross-sectional configuration with the concave side of the V facing toward the leg member, and wherein the body portion transverse walls at the neck portion juncture are also generally V-shaped relative to each other and make generally tangential contact with the convex outer surface of the tubular leg member at points oppositely circumferentially spaced from the leg member hole.

4. A construction according to claim 1 wherein the brace body portion is generally non-planar in cross-sectional configuration and is disposed at an acute angle to the leg member.

References Cited in the file of this patent

UNITED STATES PATENTS

| | | |
|---|---|---|
| 315,272 | Gath | Apr. 7, 1885 |
| 423,730 | Charlton | Mar. 18, 1890 |
| 599,343 | Mitchell | Feb. 22, 1898 |
| 1,647,485 | Tobias | Nov. 1, 1927 |
| 2,170,465 | Spencer | Aug. 22, 1939 |
| 2,189,153 | Sanford | Feb. 6, 1940 |
| 2,618,524 | Hoffmann | Nov. 18, 1952 |
| 2,643,926 | Pucci | June 30, 1953 |
| 2,747,957 | Lencioni | May 29, 1956 |